(12) United States Patent
Hoch

(10) Patent No.: US 6,249,589 B1
(45) Date of Patent: Jun. 19, 2001

(54) DEVICE FOR PASSIVE FRIEND-OR-FOE DISCRIMINATION

(75) Inventor: Heinz Hoch, Herdwangen (DE)

(73) Assignee: Bodenseewerk Geratetechnik GmbH (DE)

( * ) Notice: Subject to any disclaimer, the term of this patent is extended or adjusted under 35 U.S.C. 154(b) by 0 days.

(21) Appl. No.: 08/715,187

(22) Filed: Sep. 17, 1996

Related U.S. Application Data

(63) Continuation of application No. 08/426,595, filed on Apr. 21, 1995, now abandoned.

(30) Foreign Application Priority Data

Apr. 21, 1994 (DE) .................................. 44 13 916

(51) Int. Cl.⁷ .............................. G06K 9/00; G01S 13/78
(52) U.S. Cl. ............................................. 382/103; 342/45
(58) Field of Search ................................. 382/103, 104, 382/181, 254, 255, 263, 264, 274, 275, 276, 285, 293, 302, 307, 312, 318, 321; 89/41.22, 41.06; 235/411; 342/6, 51, 45

(56) References Cited

U.S. PATENT DOCUMENTS

| | | | |
|---|---|---|---|
| 3,742,812 | 7/1973 | Woodworth et al. | 348/169 |
| 3,794,761 | * 2/1974 | Genchi et al. | 348/169 |
| 3,879,637 | 4/1975 | Woodworth | 348/169 |
| 3,934,250 | 1/1976 | Martin, Jr. | 343/6 |
| 4,034,208 | 7/1977 | Vaeth et al. | 235/61.55 |
| 4,086,841 | * 5/1978 | MacDonald | 89/1.5 E |
| 4,316,218 | * 2/1982 | Gay | 358/125 |
| 4,418,993 | 12/1983 | Lipton | 352/57 |
| 4,550,435 | 10/1985 | Hayman | 382/103 |
| 4,688,092 | 8/1987 | Kamel et al. | 382/103 |
| 4,778,268 | * 10/1988 | Randle | 351/203 |
| 4,843,459 | * 6/1989 | Perrin et al. | 358/93 |
| 4,942,538 | 7/1990 | Yuan et al. | 364/513 |
| 5,001,348 | * 3/1991 | Dirscherl et al. | 250/372 |
| 5,123,327 | * 6/1992 | Alston et al. | 89/1.813 |
| 5,197,691 | * 3/1993 | Amon et al. | 244/3.13 |
| 5,220,361 | 6/1993 | Lehmer et al. | 351/226 |
| 5,227,859 | * 7/1993 | Leib et al. | 556/347 |
| 5,249,035 | * 9/1993 | Yamanaka | 382/154 |
| 5,347,910 | * 9/1994 | Avila et al. | 89/41.22 |
| 5,471,541 | * 11/1995 | Burtnyk et al. | 382/154 |
| 5,481,483 | * 1/1996 | Ebenstein | 382/154 |
| 5,483,865 | * 1/1996 | Brunand | 89/41.21 |
| 5,515,301 | * 5/1996 | Corby, Jr. et al. | 382/154 |
| 5,566,246 | * 10/1996 | Rao | 382/154 |
| 5,592,563 | * 1/1997 | Zahavi | 382/154 |
| 5,606,627 | * 2/1997 | Kuo | 382/154 |
| 5,751,830 | * 5/1998 | Hutchinson | 382/103 |
| 5,822,713 | * 10/1998 | Profeta | 701/302 |

FOREIGN PATENT DOCUMENTS

| | | | |
|---|---|---|---|
| 3432892 | 3/1986 | (DE) | G01S/3/78 |
| 3435634 | 4/1986 | (DE) | F41G/7/22 |
| 2242590 | 10/1991 | (GB) | G01S/3/78 |

* cited by examiner

Primary Examiner—Jose L. Couso
Assistant Examiner—Duy M. Dang
(74) Attorney, Agent, or Firm—Mallinckrodt & Mallinckrodt; Brian R. Rayve; Robert R. Mallinckrodt

(57) ABSTRACT

In a device for the passive friend-or-foe discrimination of targets, in particular of airborne targets, wherein a target to be identified is observed by a video camera, the video camera is mounted for rotation about two mutually orthogonal axes and is aligned with the target by a servo or follow-up device controlled by target radiation.

19 Claims, 5 Drawing Sheets

DEVICE FOR PASSIVE FRIEND-OR-FOE DISCRIMINATION

This is a continuation of application Ser. No. 08/426,595, filed Apr. 21, 1995, now abandoned.

BACKGROUND OF THE INVENTION

The invention relates to a device for passive friend-or-foe discrimination of targets, in particular of airborne targets, wherein the target to be identified is observed by means of a video camera.

Modern fighter aircraft or anti-aircraft batteries have target-tracking missiles which permit fighting enemy aircraft already from large distance. The distances to the aircraft to be fought at the moment of firing the target-tracking missile may be so large that the targets cannot be identified unambiguously. Therefore, the risk exists that erroneously a "friendly" aircraft is fought.

In order to avoid erroneous killing of the wrong aircraft, "IFF"-apparatus (identification friend or foe) are known. Such an IFF-apparatus transmits challenging signals, which "ask" the target aircraft, whether it is a friend. If the aircraft is a friend and has a corresponding IFF-apparatus, it understands this inquiry. It will then transmit a coded answer that it is "friendly". The IFF-apparatus may operate with radio waves, RADAR or laser.

These IFF-apparatus suffer from the disadvantage that the challenged aircraft has to have a corresponding response apparatus. Usually, the correct answers are changed daily. This presents problems with multi-national formations. A further disadvantage is that it is an active procedure: A challenging signal is transmitted. By this challenging signal, the challenger declares himself to a possible enemy.

Passive identification apparatus for friend-or-foe discrimination are known for two-seater combat aircraft, these apparatus operating with a video camera. By means of the video camera, a highly magnified image of the target is generated on a monitor for the view of the fighter observer. This permits identification ranges of about 20 km to be reached. Problems result from the fact, that the image is not stable due to vibrations of the aircraft. The fighter observer has to concentrate on the image during rather long time, in order to safely identify the target.

SUMMARY OF THE INVENTION

It is the object of the invention to improve the friend-or-foe discrimination of targets, in particular of airborne targets, carried out by means of a video camera.

According to the invention this object is achieved in an apparatus as defined in the beginning in that the video camera is mounted for rotation about two axes and is arranged to be aligned with a target by a servo device controlled by radiation from the target.

With such an assembly, the video camera is aligned with the target with the aid of target radiation, i.e. of radiation which is emitted or reflected by the target. The video camera is rotatable about two axes. Thereby, the alignment with the target can be de-coupled from the movements of the carrier, i.e. in particular of a fighter aircraft, and can be maintained pointing towards the target.

The target radiation can be detected by a missile seeker head which serves to control the servo or follow-up device. The missile seeker head is aligned, anyhow, with the target to be fought and tracks this target. The signals obtained thereby can, in parallel thereto, cause the alignment of the identification apparatus.

The target radiation may also be RADAR radiation which is reflected by the target. It is then possible to make use of the RADAR, conventionally present in fighter aircraft, to align the video camera.

It is, however, also possible to detect the target radiation by means of the video camera itself and to control the servo device by control signals obtained by image processing of the video image. Then the video camera aligns itself with the target on the basis of the image detected by the camera itself.

In order to avoid disturbances due to the self-movements of the fighter aircraft, the video camera may be mounted on an inertially stabilized platform. The stabilized platform is rotated by control signals to align the camera with the target independently of movements of the fighter aircraft. To this end, the control signals may, for example, be applied to torqers of stabilizing gyros.

For the identification of the target, the target detected by the video camera may be imaged on the screen of a monitor. Transformation signals obtained by image processing may be used to keep the image of the target on the monitor substantially stationary in the center of the screen. This permits undisturbed observation and identification of the target.

In order to permit, on one hand, detection of a target within a relatively large solid angle and, on the other hand, to permit identification of the target at high magnification and resolution, the video camera may have a zoom objective, which, during the target detection phase, is adjusted to provide a relatively short focal length and, after target detection and alignment of the optical axis of the video camera with the target, is adjusted to provide a relatively long focal length and a correspondingly larger magnification.

Advantageous are image processing means for enhancing the contrast of the target image relative to its background. Image processing means can be provided for automatic evaluation of the image of the target received from the video camera can be provided to recognize friendly or enemy targets.

An embodiment of the invention is described in greater detail hereinbelow with reference to the accompanying drawings.

DESCRIPTION OF PREFERRED EMBODIMENTS OF THE INVENTION

Figure 1:
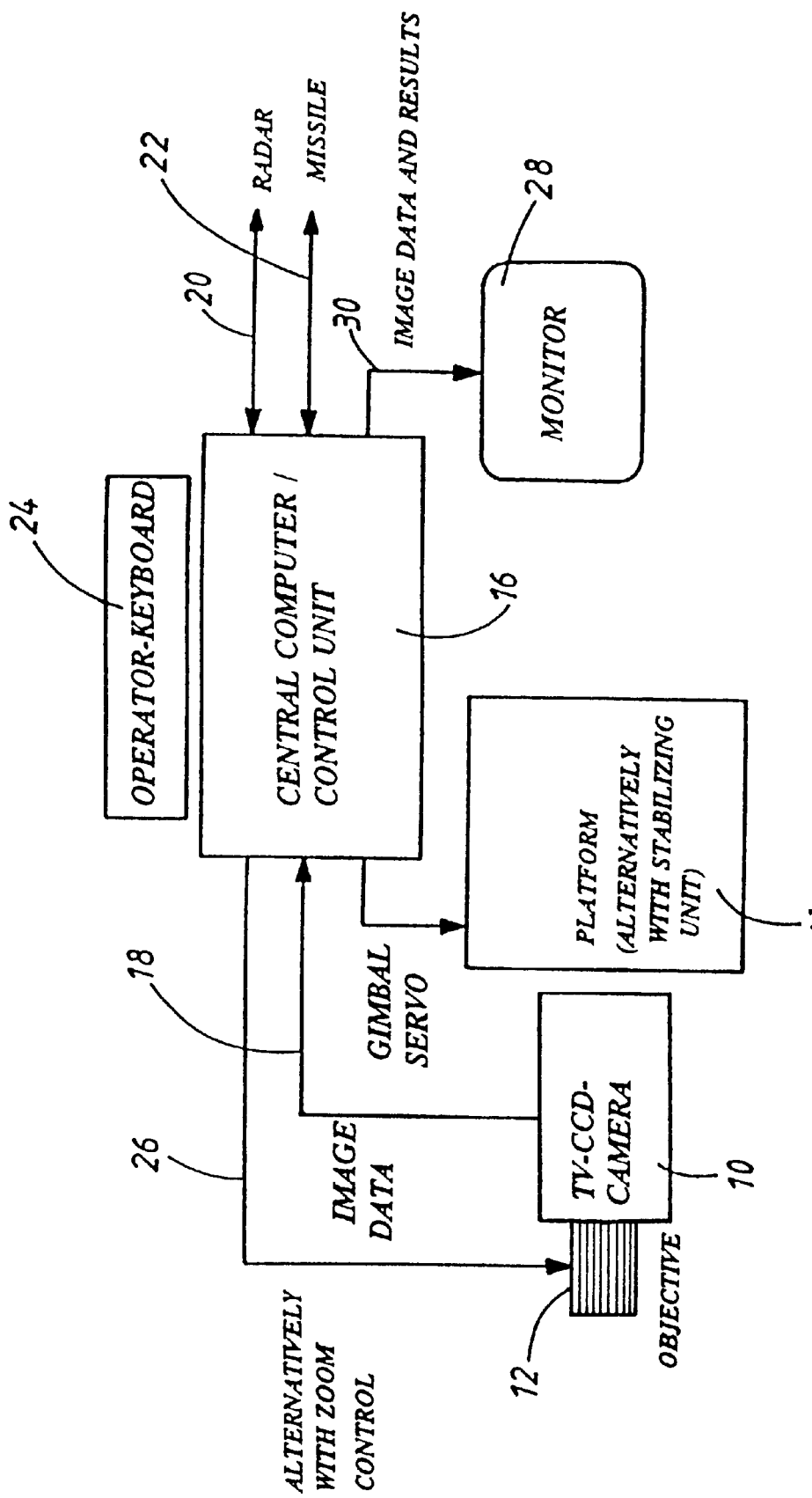
FIG. 1 is a block diagram of a device for the passive friend-or-foe discrimination of targets, in particular of airborne targets, wherein a target to be identified is observed by means of a video camera.

Referring to FIG. 1, numeral 10 designates a CCD-video camera with a zoom objective 12. The video camera is mounted on a platform 14. The platform 14 is inertially stabilized by an inertial sensor unit and, thereby, is de-coupled from the movements of the carrier fighter aircraft. The image signal from the video camera 10 is applied to a central computer and control unit 16. This is illustrated in FIG. 1 by a connection 18.

The central computer and control unit 16 receives data from a RADAR installed in the fighter aircraft, as illustrated by a double arrow 20, or from a missile having a target tracking seeker head, as illustrated by a double arrow 22. The missile is coached by a control unit 24.

The central computer and control unit 16 controls the zoom objective 12. This is illustrated by a connection 26. The central computer and control unit 16 supplies data to a monitor 28. This is illustrated by a connection 30. The data may be identification results, which are provided by the computer and control unit 16 by image processing and comparison with stored patterns of "friendly" and "enemy" aircraft. It is, however, also possible to generate an image of the target directly on the screen of the monitor.

The illustration of FIG. 1 represents different possibilities:

The central computer and control unit 16 receives, from RADAR of the carrier fighter aircraft, or of the anti-aircraft battery, information about the target direction. Alternatively, this information may also be received from the seeker head pointing to the target of a missile. The computer and control unit computes therefrom control signals for the follow-up movement of the platform 14. The platform is aligned in such a way by these control signals that the optical axis of the video camera 10 is aligned with the target.

In another mode of operation, the image signals from the video camera 10 are evaluated by the computer and control unit 16. Thereby, the target is recognized. The target coordinates are determined in a camera-fixed coordinate system. This is done with digital image processing methods known per se, which are used in modern target tracking seeker heads. Control signals for the platform 14 are generated from the target coordinates thus determined. These control signals rotate the platform 14 and, thereby, the video camera 10 such that the target is shifted to the image center. Correspondingly, the target appears also in the image center on the screen of the monitor 28. This centering through the platform makes the representation of the target independent of the movements of the carrier fighter aircraft.

When the described assembly is used in aircraft, vibrations can be transmitted to the platform, if the aircraft exercises high-load flight manoevers. Such vibrations cannot be compensated for completely by the described platform control. In this case, the computer and control unit provides for an appropriate geometric transformation of the image such that the image is represented stationary in the center of the screen of the monitor.

If, in a particular case, the coaching by the RADAR or by the seeker head of the missile is too inaccurate, the zoom objective 12 is adjusted by the computer and control unit 16. In a target acquisition phase, the zoom objective is adjusted to provide a short focal length. Thereby, a relatively large field of view is obtained. The image resolution is correspondingly lower. For the target acquisition, however, high image resolution is not yet required. When the target has been acquired and the optical axis of the video camera has been aligned with the target, the focal length of the zoom objective 12 is made longer by the computer and control unit 16. Thereby, the image of the target is magnified. This results in high image resolution. This high image resolution permits identification of the target.

The contrast of the target relative to its background is enhanced by the computer and control unit by means of well-known image processing methods. Thereby, the contour of the target is determined and emphasised in the image. This permits the observer to evaluate the image more easily, and increases the safety of the identification.

Parallel to the representation of the target on the screen of the monitor and to the visual evaluation, there is an automatic evaluation of the contour of the target in the computer and control unit. To this end, three-dimensional models of the possible friendly and enemy aircraft are stored in the computer and control unit. With methods of knowledge-based image processing the aspect angle and the type of the target are determined. The result is indicated on the monitor.

The described combination of automatic and partially-automatic target recognition increases the identification capacity of the total system.

Figure 2:
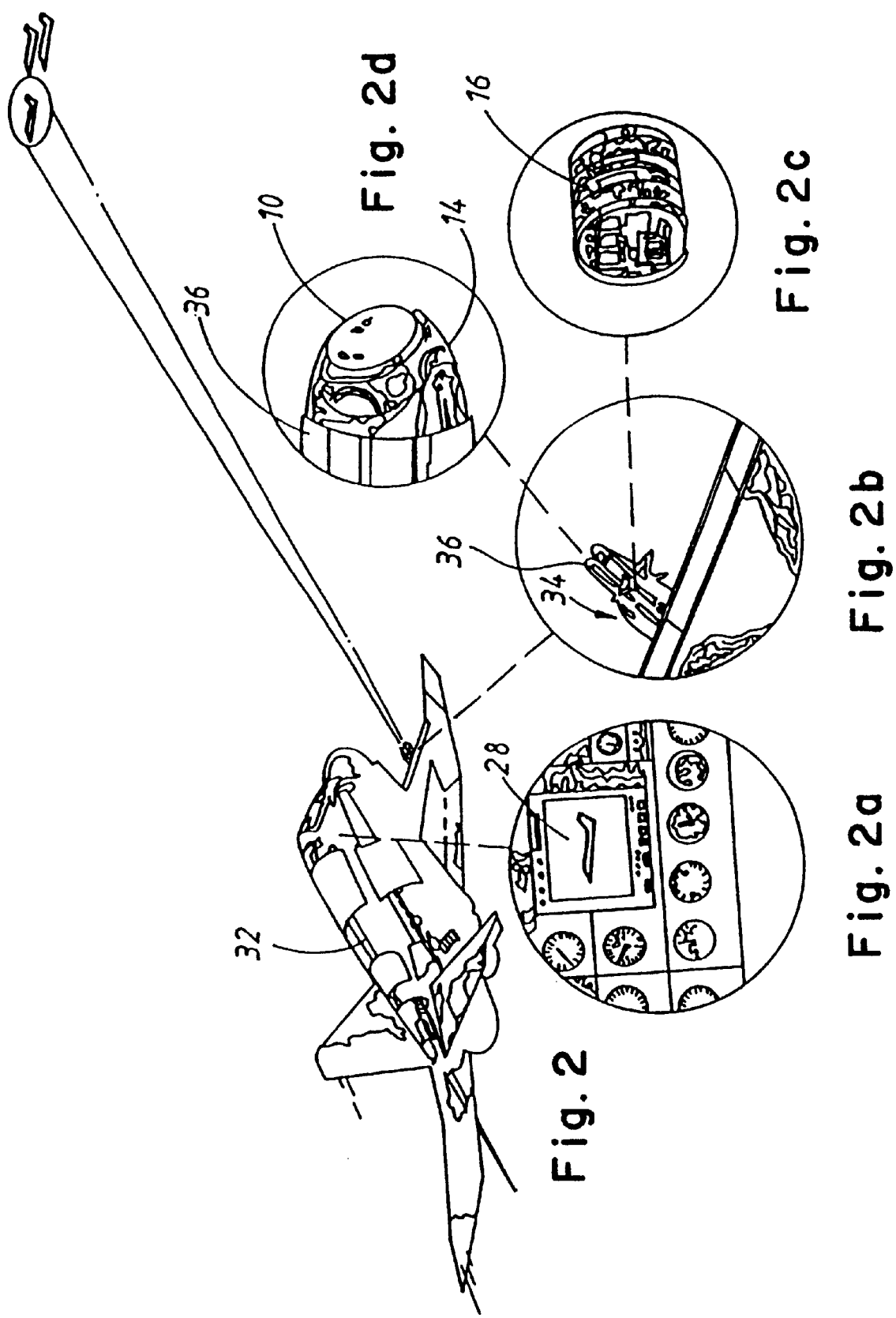
FIG. 2 is a schematic-perspective view and illustrates a preferred way of designing and attaching the device at a fighter aircraft.

FIG. 2 schematically illustrates the structural setup of the device for passive friend-or-foe discrimination of airborne targets. Numeral 32 designates a fighter aircraft. A launcher 34 is attached to the fighter aircraft. The platform 14 and the video camera 10 are mounted in the tip of the launcher 34. Also the central computer and control unit 16 is accommodated in the launcher 34. The monitor 28 is arranged in the cockpit of the fighter aircraft 32. Coaching of the optical axis of the video camera 10 is effected through the interface of the launcher 34 by means of the on-board RADAR of the fighter aircraft or by means of the seeker head signals of the missile.

The central computer and control unit 16 comprises a massively parallel computer stage for the pixel-oriented image processing and a multi-processor stage with digital signal processors for computing the signals for the follow-up control of the platform and for the higher functions of the image evaluation. The image signals and the result of the automatic image evaluation are transmitted to the aircraft and are represented there on the monitor 28. In many fighter aircraft, such a monitor is already provided. This monitor is then, if required, switched over to the present particular application.

It is also possible to omit the transmission of the image into the cockpit of the fighter aircraft 32. Then only the result of the automatic identification of the target is transmitted through the interface of the missile launcher and is indicated to the pilot either visually by symbols in the heads-up display or acoustically in an earphone.

Figure 3:
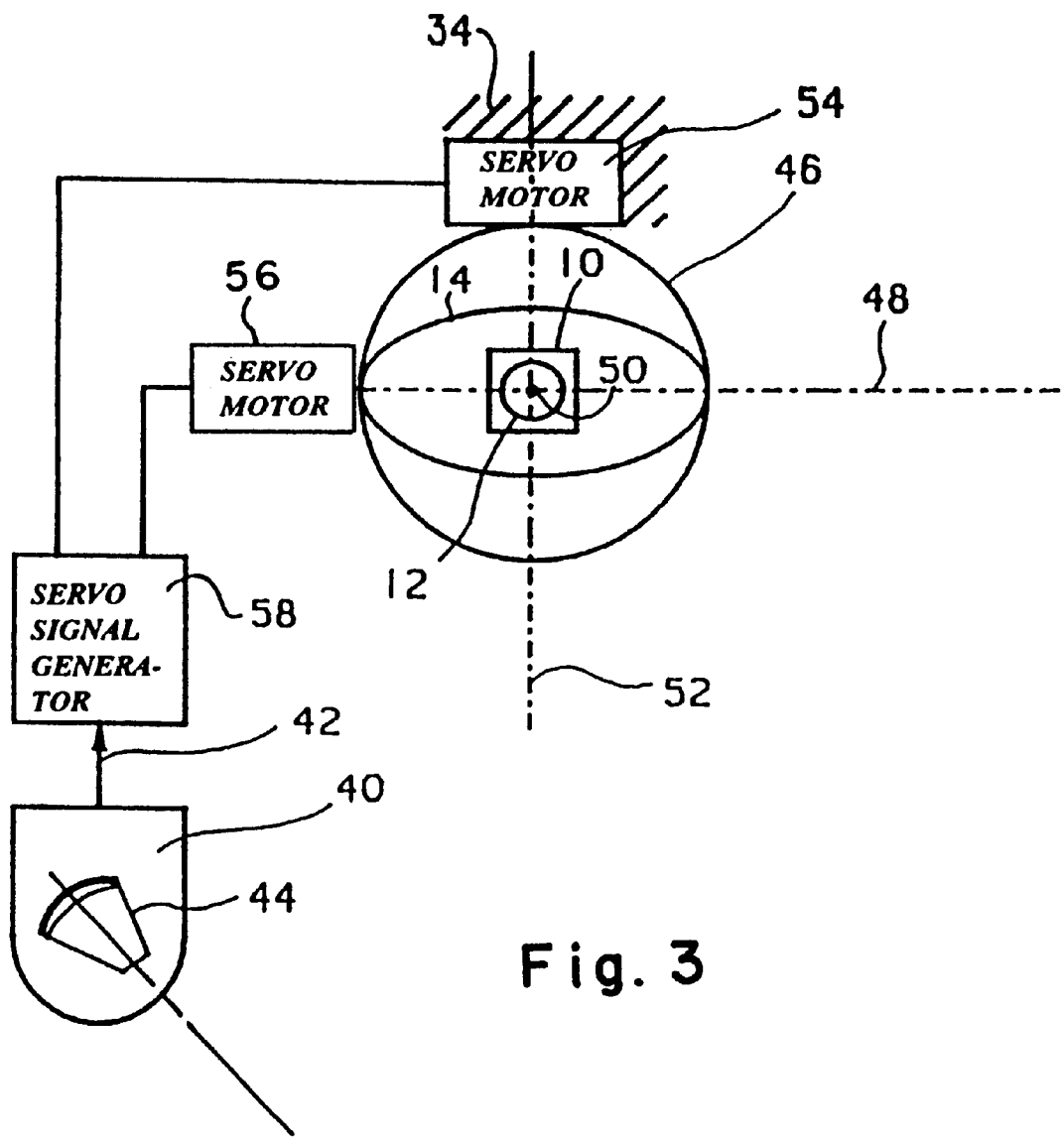
FIG. 3 is a schematic representation and illustrates the alignment of the platform in accordance with signals which are provided by a seeker head of a target tracking missile.

FIG. 3 shows an arrangement, wherein the platform 14 is aligned by signals, which are provided by the seeker head 40 of a missile at an output 42 thereof, while the missile is still retained in a launcher. These signals align the optical system 44 of the seeker head 40 with the target. These signals can then be used also to align the video camera 10 with the target. The video camera 10 is mounted on a platform 14. The platform is mounted in a gimbal 46 for rotation about an axis 48. The axis 48 is orthogonal to the optical axis 50 of the objective 50 of the video camera 10. The gimbal, in turn, is mounted for rotation in the launcher 34 about an axis 52, which is orthogonal to the axis 48. Therefore, the optical axis 50 of the objective 12 can be deflected about the intersection of the axes 48 and 52 with two degrees of freedom.

A servomotor 54 is effective between the launcher 34 and the gimbal 46 about the axis 52. The servomotor 54 can rotate the gimbal 46 about the axis 52. A servomotor 56 is attached to the gimbal 46 on the axis 48. The servomotor 56 is arranged to rotate the platform 14 about the axis 48 relative to the gimbal 46. The servomotors are energized by control signals, which are provided by a control signal generator 58 in accordance with the signals at the output 42 of the seeker head. The servomotors are energized by these control signals in such a way, that the optical axis of the objective 12, in the same way as the optical axis of the optical system 44 the seeker head 40, is aligned with the target (located at infinity).

Figure 4:
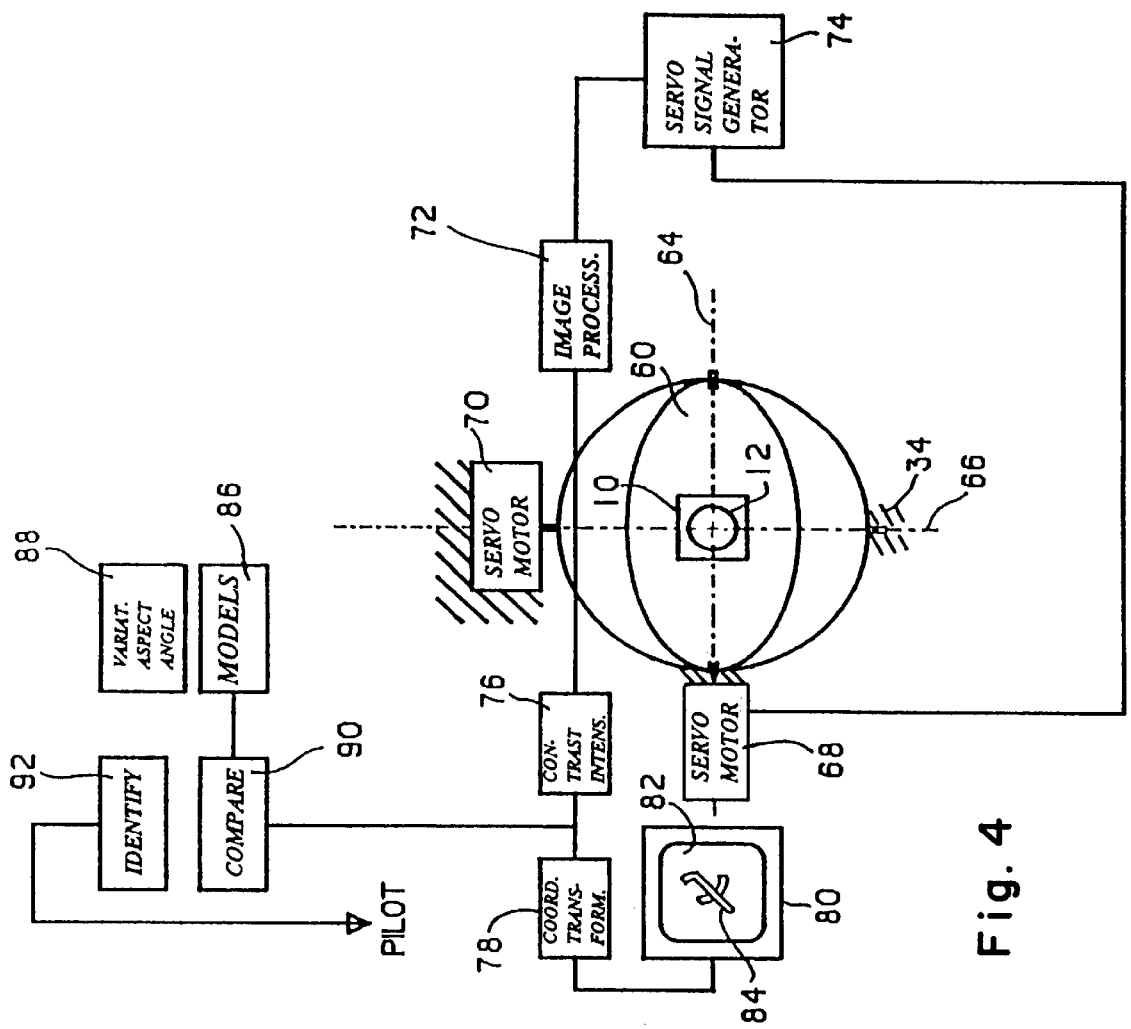
FIG. 4 is a schematic representation and illustrates an assembly wherein the platform is aligned in accordance with control signals which are derived from the signals of the video camera itself by signal processing.

FIG. 4 shows an arrangement, wherein the alignment of the video camera 10 with the target is effected on the basis of the image of the video camera itself, subjected to appropriate image processing.

The video camera 10 with the objective 12 is arranged on a platform 60. The platform 60 is mounted in a gimbal 62 for rotation about an axis 64 orthogonal to the optical axis of the objective. The gimbal is mounted in the launcher for rotation about an axis 66, which is orthogonal to the axis 64. A servomotor 68 is attached to the gimbal 62 on the axis 64 and acts between gimbal 62 and platform 60. The servomotor 68 is arranged to rotate the platform 60 relative to the gimbal 62. A further servomotor 70 is attached to the launcher 34 on the axis 66 and acts between launcher 34 and gimbal 62. The servomotor is arranged to rotate the gimbal 62 relative to the launcher 34. In this way, the optical axis of the objective 12 can be adjusted with two degrees of freedom about the intersection of the axes 64 and 66.

The image information from the video camera 10 undergoes image processing by image processing means 72. The image processing means provide signals, which represent the target deviation of an observed target from the optical axis of the objective 12 in a camera-fixed coordinate system. These signals are applied to a control signal generator 74. The control signal generator 72 applies control signals to the servomotors 68 and 70. The servomotors rotate the platform such that the optical axis of the objective points to the target and remains aligned with the target.

At the same time, the image information from the video camera 10 is applied to a contrast intensifier. The contrast intensifier is part of the computer and control unit 16. The contrast intensification is a way of image processing well known per se and, therefore, is not described in detail here. The contrast intensification causes an image to be generated which has contours clearly contrasting with its background. This image information is applied to a monitor 80 through coordinate transformation means 78. Then an image 84 of the target appears on the screen 82 of the monitor 80. In the image information, each pixel has asssociated coordinates in the form of column and row indices. These coordinates are transformed by the coordinate transformation means 78 such that the image 84 of the target always appears stationary in the center of the screen 82, independently of vibrations of the aircraft, which might be transferred to the platform 60. Therefore, the pilot sees the image of the target stationary and with strong contrasts. This facilitates the pilot to recognize a target as "friend" or "foe".

The contrast-intensified image information about the target is compared with three-dimensional "models" of possible targets. In FIG. 4, the models are illustrated by a block 86. The contours of the models, as they appear at different aspect angles, are generated consecutively. This is illustrated by block 88. The contours thus generated are compared with the image information which is generated by the contrast intensifier 76. This comparison is illustrated by a block 90. The comparison provides an identification of the target as friend or foe. This is illustrated by block 92. In accordance with this ientification, a visual or acoustic information is tranmitted to the pilot.

Figure 5:
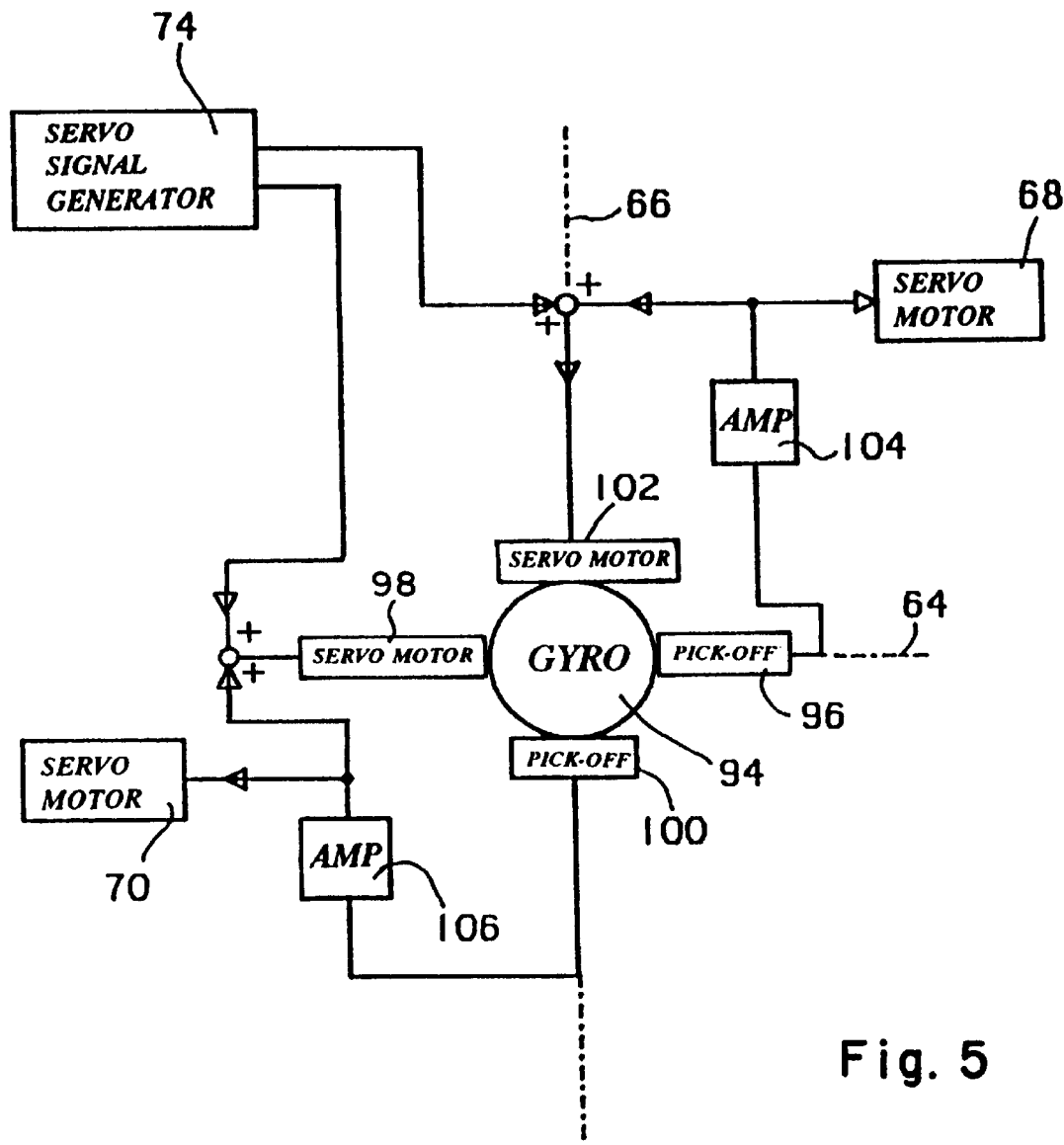
FIG. 5 is a block diagram and illustrates, how the control signals are applied to an inertially stabilized platform.

In order to improve the de-coupling of the platform 60 from the movements of the aircraft, the platform 60 can be stabilized by means of an inertial sensor, for example of a two-axis rate gyro 94. The rate gyro 94 is mounted on the platform 60 such that the input axes of the rate gyro 94 extend parallel to the axes 64 and 66 or coincide with these axes. In FIG. 5, the inertial stabilization and the follow-up is illustrated as a block diagram.

A pick-of f 94 and a torquer 98 are arranged on the input axis 64 of the rate gyro 94. A pick-off 100 and a torquer 102 are arranged on the input axis 66 of the rate gyro 94. The signal from the pick-off 96 on the input axis 64 is applied through an amplifier network 104 to the torquer 102, which is arranged on the input axis 66. Inversely, the signal of the pick-off 100 is applied through an amplifier network 106 to the torquer 98, which is arranged on the input axis 66. This is the conventional design of a two-axis rate gyro, for example of a dynamically tuned gyro (DTG). The gyro rotor is electrically caged to a central position. The signals applied to the torquers 98 and 102 are proportional to the angular rates about the input axes 66 and 64, respectively. These signals are simultaneously applied to the servomotors 68 and 70, respectively. Rotary movement of the aircraft will thereby compensated for by an adjusting movement of the servomotors. The platform 60 is de-coupled from the movements of the aircraft.

The control signals from the control signal generator derived from the target deviation relative to the video camera 10 are, in addition to the amplified pick-off signals from the pick-offs 100 and 96, applied to the torquers 98 and 102, respectively. Thereby, the rate gyro this precession through the servomotors 68 and 70.

What is claimed is:

1. A device for the passive friend-or-foe discrimination of targets, comprising:

video camera means defining an optical axis and providing video signals representative of an image of a target to be identified, mounting means for mounting said video camera means for rotation about two axes, means exposed to radiation from said target and generating position signals indicative of the position of said target in a field of view, receiving means for receiving said position signals and generating therefrom follow-up signals, servo means connected to said mounting means and receiving said follow-up signals, said servo means responding to said follow-up signals by rotating said mounting means and thereby said video camera means about said two axes and thereby aligning said optical axis defined by said video camera means with said target;

said image processing means connected to said video camera means and receiving said video signals representative of said image of said target; and said image processing means evaluating said video signals to identify said target as a friendly or enemy target.

2. A device as claimed in claim 1, wherein said means exposed to target radiation for generating said position signals comprises a seeker head of a target tracking missile.

3. A device as claimed in claim 1, wherein said means exposed to target radiation for generating said position signals is responsive to RADAR radiation reflected by said target.

4. A device as claimed in claim 1, wherein said means exposed to radiation from said target comprises said video camera means, said image processing means processing said video signals provided by said video camera means and thereby generating said position signals.

5. A device as claimed in claim 1, wherein said means for mounting said video camera means for rotation about two axes comprises an inertially stabilized platform.

6. A device as claimed in claim 1, wherein said image processing means comprise a monitor having a screen, said monitor displaying on said screen said image of said target to be identified.

7. A device as claimed in claim 6, and further comprising automatic image transformation means for providing transformation signals for transforming pixel coordinates on said screen of said monitor such that the image of the target remains substantially stationary at a given location on said screen.

8. A device as claimed in claim 6, wherein said video camera means comprises a zoom objective and said image processing means include means for adjusting said zoom objective to provide a relatively short focal length during a target acquisition phase, and for adjusting said zoom objective to provide a relatively long focal length and correspondingly larger magnification of the image of the target displayed on said screen after target acquisition and alignment of said optical axis of said video camera means with said target, in order to thereby enable said target to be identified as friendly or enemy target.

9. A device as claimed in claim 6, and further comprising image processing means for enhancing the contrast of the target image on said screen relative to its background.

10. A device as claimed in claim 1, wherein the image processing means for automatically evaluating the image of the target further comprises means for storing a plurality of three dimensional models of possible targets, and wherein contours of these three dimensional models are compared with the image of the target.

11. A device for the passive friend-or-foe discrimination of targets, comprising:
    video camera means for observing a target to be identified, said video camera means being capable of resolving the target to be identified at high magnification and resolution, said video camera means defining an optical axis thereof, and providing video signals;
    means for mounting said video camera means upon a carrier, the means for mounting having provision for rotation about at least two axes and comprising an inertially stabilized platform;
    means exposed to radiation from a target for providing position signals indicative of the position of said target in a field of view;
    means receiving said position signals for generating therefrom follow-up signals;
    servo means, responsive to said follow-up signals, for rotating said platform and thereby said video camera means about said at least two axes to align said optical axis with said target; and
    image processing means for automatically evaluating an image of the target captured by the video camera to discriminate between friendly and enemy targets.

12. A device as claimed in claim 11, further comprising a monitor for displaying an image of the target as observed by the video camera.

13. A device as claimed in claim 12, further comprising image transformation means for transforming pixel coordinates on the monitor such that the image of the target remains substantially stationary at a given location on the screen.

14. A device as claimed in claim 12, further comprising image processing means for enhancing the contrast of the target image relative to its background.

15. A device as claimed in claim 11, wherein the image processing means for automatically evaluating the image of the target further comprises means for storing a plurality of three dimensional models of possible targets, and wherein contours of these three dimensional models are compared with the image of the target.

16. A method for the passive friend-or-foe discrimination of a target, comprising the steps of:
    providing video camera means defining an optical axis and observing a target to be identified, means for mounting said video camera means for rotation about at least two axes, the means for mounting comprising an inertially stabilized platform, and a detector;
    generating, by means of said video camera means, video signals representative of an image of said target;
    exposing said detector to radiation from the target and thereby generating position signals indicative of the position of the target in a field of view;
    using the position signals to rotate said means for mounting said video camera about said at least two axes and thereby automatically align the optical axis of the video camera with the target; and
    processing said video signals to generate an image of said target and evaluating said image to determine whether said image is an image of a friend or foe.

17. The method of claim 16 for the passive friend-or-foe discrimination of a target, wherein the step of determining whether the image is an image of friend or an image of foe is performed by automatic image processing apparatus.

18. The method of claim 16 for the passive friend-or-foe discrimination of a target, wherein the step of exposing a detector is performed with a detector responsive to radar reflections from the target.

19. A device for the passive friend-or-foe discrimination of targets, comprising:
    video camera means defining an optical axis and providing video signals representative of an image of a target to be identified;
    mounting means for mounting said video camera means upon a carrier, the mounting means having a provision for rotation about at least two axes and comprising an inertially stabilized platform;
    means exposed to radiation from said target and generating position signals indicative of the position of said target in a field of view;
    receiving means for receiving said position signals and generating therefrom follow-up signals;
    servo means connected to said mounting means and receiving said follow-up signals;
    said servo means responding to said follow-up signals by rotating said platform and thereby said video camera means about said two axes and thereby aligning said optical axis defined by said video camera means with said target;
    image processing means connected to said video camera means and receiving said video signals representative of said image of said target; and
    said image processing means evaluating said video signals to identify said target as a friendly or enemy target.

* * * * *